United States Patent
Goldstein et al.

(10) Patent No.: US 6,641,316 B1
(45) Date of Patent: Nov. 4, 2003

(54) ADJUSTABLE KEYBOARD WITH ADJUSTING AND LOCKING MECHANISM, AND METHOD OF ITS USE

(76) Inventors: Mark Goldstein, 525 E. 72nd St. Apartment 2E, New York, NY (US) 10021; Andrzej Skoskiewicz, 925 Oak La., #3, Menlo Park, CA (US) 94301; Clifford Jue, 111 Ponderosa Ct., Santa Cruz, CA (US) 95060; David John Law, 10 Cordova Ct., Portola Valley, CA (US) 94028

( * ) Notice: Subject to any disclaimer, the term of this patent is extended or adjusted under 35 U.S.C. 154(b) by 0 days.

(21) Appl. No.: 09/384,700

(22) Filed: Aug. 27, 1999

(51) Int. Cl.⁷ ................................................. B41J 5/10
(52) U.S. Cl. .................. 400/489; 400/492; 411/32; 403/90
(58) Field of Search .................. 400/489, 492, 400/493, 488, 493.1, 494, 82, 485; 361/680; 341/22; 411/32, 33; 403/90, 91

(56) References Cited

U.S. PATENT DOCUMENTS

| | | | |
|---|---|---|---|
| 3,709,088 A | * | 1/1973 | Pitzer ........................ 85/74 |
| 4,509,873 A | | 4/1985 | Ryan |
| 4,597,681 A | | 7/1986 | Hodges |
| 4,661,005 A | | 4/1987 | Lahr |
| 5,067,834 A | * | 11/1991 | Szmanda ................... 400/489 |
| 5,073,050 A | | 12/1991 | Andrews |
| 5,092,551 A | * | 3/1992 | Meier ....................... 248/276.1 |
| 5,122,786 A | | 6/1992 | Rader |
| 5,160,165 A | * | 11/1992 | Hoblingre ................... 280/775 |
| 5,228,791 A | | 7/1993 | Fort |
| 5,267,127 A | | 11/1993 | Pollitt |
| 5,318,367 A | | 6/1994 | Braun et al. |
| 5,342,005 A | | 8/1994 | Szmanda et al. |
| 5,351,066 A | | 9/1994 | Rucker et al. |
| 5,361,082 A | | 11/1994 | Chung |
| 5,388,921 A | | 2/1995 | Chung |
| 5,393,150 A | | 2/1995 | Fort |
| 5,410,333 A | | 4/1995 | Conway |
| 5,424,728 A | | 6/1995 | Goldstein |
| 5,426,449 A | | 6/1995 | Danziger |
| D362,434 S | | 9/1995 | Abell, Jr. et al. |
| 5,454,652 A | | 10/1995 | Huellemeier et al. |
| 5,456,542 A | | 10/1995 | Welch et al. |
| 5,457,452 A | | 10/1995 | Skovronski |
| 5,466,078 A | | 11/1995 | Szmanda et al. |
| 5,502,460 A | | 3/1996 | Bowen |
| 5,519,570 A | | 5/1996 | Chung |
| 5,527,116 A | | 6/1996 | Huellemeier et al. |
| 5,543,790 A | * | 8/1996 | Goldstein ................... 341/22 |
| 5,574,481 A | | 11/1996 | Lee |
| 5,596,480 A | | 1/1997 | Manser et al. |

(List continued on next page.)

FOREIGN PATENT DOCUMENTS

| | | |
|---|---|---|
| WO | WO 92/00851 | 1/1992 |
| WO | WO 93/01054 | 1/1993 |

OTHER PUBLICATIONS

"Weird Keyboards: Rx for Hands", PC World, May 1993.

*Primary Examiner*—Andrew H. Hirshfeld
*Assistant Examiner*—Kevin D Williams
(74) *Attorney, Agent, or Firm*—Kenyon & Kenyon

(57) ABSTRACT

The invention relates to an adjustable keyboard to be used, for example, at a computer terminal. The preferred embodiment is in the form of a keyboard having a number of keys, the keyboard being formed in at least two segments which are mutually movable relative to one another using a hinge or joint. Each of the segments of the keyboard has mounted thereon some of the keys. The relatively movable nature of the keyboard aims at reducing stress and discomfort to the user by eliminating contortion to the user's wrists. More particularly, discomfort to the user caused by pronation of the wrists and/or ulnar deviation of the wrists is reduced. The hinge or joint may be in the form of a ball and socket-type joint with a locking mechanism, which preferably includes a pivoted handle, in the form of a lever, used for locking and unlocking the hinge or joint.

2 Claims, 4 Drawing Sheets

U.S. PATENT DOCUMENTS

| | | |
|---|---|---|
| 5,612,691 A | 3/1997 | Murmann et al. |
| 5,613,786 A | 3/1997 | Howell et al. |
| 5,644,338 A | 7/1997 | Bowen |
| 5,646,817 A | 7/1997 | Manser et al. |
| 5,651,622 A | 7/1997 | Kim |
| 5,662,422 A * | 9/1997 | Fort ................... 400/489 |
| 5,717,431 A | 2/1998 | Chia-Ying et al. |
| 5,734,548 A | 3/1998 | Park |
| 5,788,386 A * | 8/1998 | Hayashi ................ 400/489 |
| 5,813,258 A * | 9/1998 | Cova ................... 70/225 |
| 5,838,263 A | 11/1998 | Chang |
| 5,841,635 A | 11/1998 | Sadler et al. |
| D408,804 S | 4/1999 | Kurokawa et al. |
| 6,234,961 B1 * | 5/2001 | Gray ................... 600/234 |

\* cited by examiner

ADJUSTABLE KEYBOARD WITH ADJUSTING AND LOCKING MECHANISM, AND METHOD OF ITS USE

BACKGROUND OF THE INVENTION

1. Field of the Invention

The following invention relates to keyboards, and more particularly to a keyboard formed in two or more mutually pivotable segments which may be adjusted and locked into a number of different ergonomic positions.

2. Description of the Prior Art

Known keyboards of the type used at a computer terminal, for example, generally include a unitary board onto which alphanumeric keys are attached. It is a disadvantage of such known keyboards that the wrists and/or arms and shoulders of an operator must be contorted into a configuration which is stressful to the user after prolonged use of the keyboard. This problem is brought about by the fact that the hands of the user must be turned outwardly by pivoting of the wrists relative to the forearms, resulting in ulnar deviation. Discomfort to the user caused by pronation of the wrists is also a problem with these known keyboards. Pronated posture can also transmit stresses into the neck and shoulders of the user.

It is desirable to reduce pronation and ulnar deviation of the wrists in computer keyboards. To that end, U.S. Pat. Nos. 5,424,728 and 5,543,790 describe adjustable keyboards with at least two segments which are movable relative to one another via a hinge or joint. By moving the segments, the orientation of the user's wrists and hands can be adjusted to allow for reduction of ulnar deviation and pronation of the wrists. The hinge or joint in those patents is disclosed as preferably being a ball and socket-type joint.

U.S. Pat. Nos. Des. 362,434 and 5,454,52, assigned to Lexmark and U.S. Pat. No. 5,527,116, assigned to Maxi Switch, each show adjustable keyboards including a mechanism for locking the keyboard segments in place. However, in each of the keyboards described in those patents, the locking mechanism includes a large number of parts. As a result, those keyboards can be difficult to manufacture and assemble and therefore can be expensive, and those keyboards can be difficult for the user to adjust and lock.

SUMMARY OF THE INVENTION

It is the object of the present invention to overcome or substantially ameliorate the disadvantages of the prior art. It is therefore an object of the present invention to provide an adjustable keyboard which is inexpensive and simple to manufacture, is made of few parts and parts which are easy to manufacture and assemble, and which is easy for the user to adjust to a large number of positions.

There is disclosed a keyboard having a plurality of keys, the keyboard having at least two segments which are mutually movable relative to one another, and wherein each segment of the keyboard includes some of the keys. Typically, the keyboard has at least two mutually pivotable segments which are attached to one another at a top end of the keyboard segments by way of a hinge or joint, such that a front edge of the keyboard may spread apart in at least a substantially horizontal plane, to thereby reduce ulnar deviation in the keyboard user. Advantageously, the hinge or joint is adapted to allow pivoting in both horizontal and vertical planes such that the two segments of the keyboard may reside in different planes, so that the center of the keyboard is raised to reduce pronation and therefore decrease tension in the wrists and forearms of the user.

The hinge or joint may preferably be composed of a ball and socket joint which includes a locking mechanism. The locking mechanism may be fashioned using a pivoting handle, in the form of a lever, which includes a cam. The cam may be used to force bearing surfaces against a ball on a ball element, to thereby frictionally retain the ball and socket joint in a fixed position. Upon pivoting of the handle away from the keyboard, the cam may release the ball from the friction fit with the bearing surfaces, thereby allowing the ball to slide in the socket, and therefore allowing the keyboard segments to be adjusted relative to one another.

A support may be provided generally below the ball and socket joint so as to maintain the central region of the keyboard at a raised preselected level, if needed.

Beneficially, a number pad region of the keyboard can be provided which is pivotable relative to one of the segments such that the number pad region may reside in a plane other than the plane of the segment to which the number pad is hinged.

Typically, the keyboard is divided into segments which coincide with generally accepted keyboard areas used by a particular hand.

The present invention provides a keyboard in which the wrists of the operator need not be contorted as they would be in use of a conventional keyboard.

In order to electrically connect the keys of one segment of the keyboard to the other, a cable or any suitable contact may be provided between the two segments. Additionally, an infrared or other electromagnetic signal may be used to transmit signals from the keyboard to the computing device without the need for a cable or other physical connection.

BRIEF DESCRIPTION OF THE DRAWINGS

Preferred forms of the present invention will now be described by way of example with reference to the accompanying drawings, wherein.

DETAILED DESCRIPTION OF THE PREFERRED EMBODIMENTS

Figure 1:
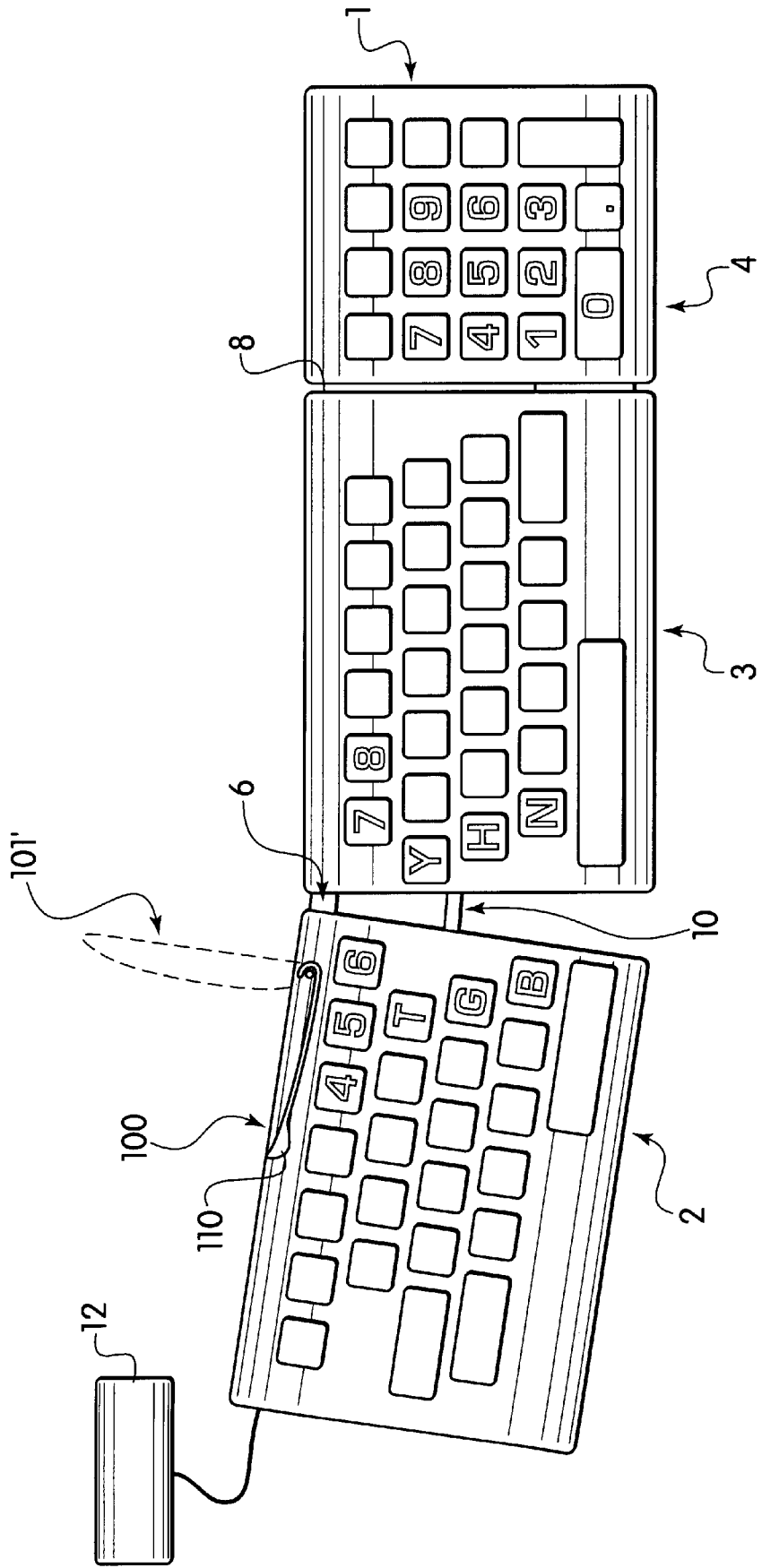
FIG. 1 is a schematic plan view of a keyboard of the present invention.

The present invention relates to a keyboard 1 to be used, for example, at a computer terminal 12. In the accompanying drawings there is schematically depicted a keyboard generally indicated by reference numeral 1. Keyboard 1 includes separate segments 2, 3, and 4, each having a plurality of keys 5. It is to be understood that the configuration of the keys on segments 2, 3, and 4, may be in any suitable form which allows access to the appropriate hand corresponding to segments 2, 3, and 4, and need not be the configuration shown in FIG. 1.

Segments 2 and 3 of keyboard 1 are mutually attached by a hinge or joint 6, which may provide one or more degrees of freedom of relative movement between segments 2 and 3. Hinge or joint 6 in the preferred embodiments is described in more detail below. As also described in more detail below, a handle 100, in the form of a lever, forms a portion of a keyboard locking mechanism. The handle 100 may be pivoted from a locked position, which fixes the position of the hinge or joint 6, to an unlocked position 100' (dashed lines), which allows pivoting movement of the segments 2, 3 relative to one another in one or more planes. The segment 2 or 3 containing the handle 100 may include an indentation 110 near the end of the handle 100 to allow easier access to, and pivoting of, the handle 100 by the user.

Segment 4 of keyboard 1, if provided, has mounted thereon numerical keys 5 and is attached to segment 3 by hinge or joint 7. Hinge or joint 7 may extend along line 8 illustrated in FIG. 1 so as to provide at least one degree of relative movement between segments 3 and 4. Alternatively, a hinge or joint of the type described below may be employed between segments 2 and 3 and may be located at either an upper or lower end of line 8 in FIG. 1. Segment 4 is an optional segment, and the keyboard 1 may be formed of only segments 2 and 3.

Figure 2:
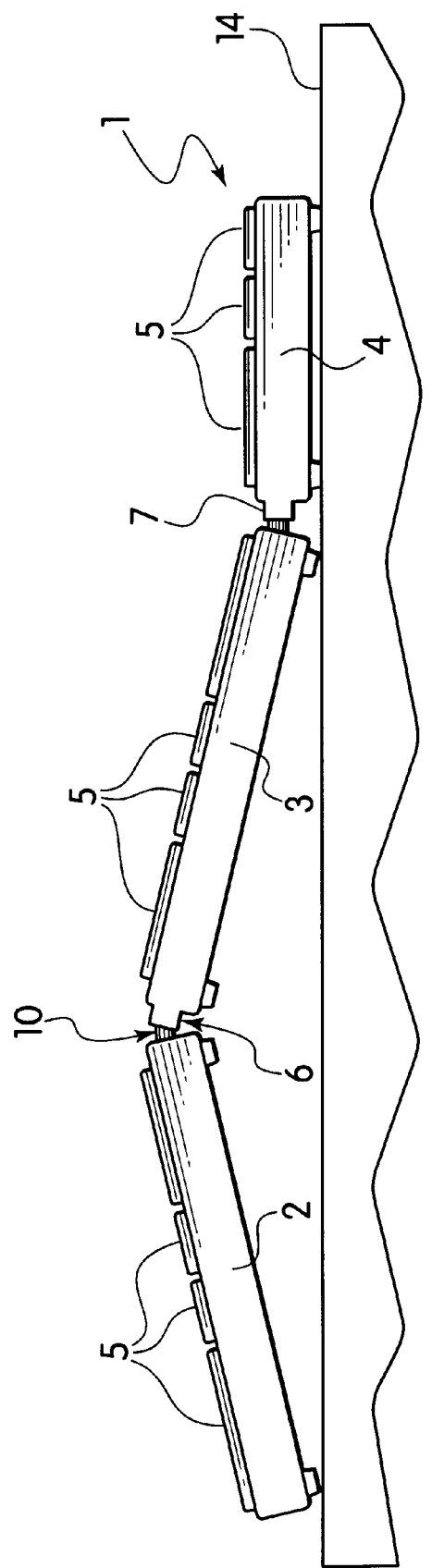
FIG. 2 is a schematic elevational view of the keyboard of FIG. 1.

It should be appreciated that segments 2 and 3 of keyboard 1 may pivot with respect to one another while each remaining in a single plane (i.e., the plane of FIG. 1), or in multiple planes (i.e., the planes of FIGS. 1 and 2). Movement of the segments 2, 3 in the plane of FIG. 1 acts to prevent or reduce ulnar deviation of the user's hands and wrists, while movement of the segments 2, 3 in the plane of FIG. 2 acts to prevent or reduce pronation of the user's wrists. As depicted in FIG. 2, a center region of keyboard 1 is raised above the level of a desk 14 on which the keyboard 1 is supported. An optional support (not shown) may be provided generally below the hinge or joint 6 so as to maintain the central region of the keyboard 1 at a raised preselected level, if needed.

Should an operator of the keyboard 1 not be comfortable with a hinged-apart orientation of the keyboard 1, the keyboard 1 may simply be returned to a conventional configuration.

In order to electrically connect the keys of one segment (e.g. segment 2) to the other (e.g. segment 3), a cable 10 or any suitable contact may be provided between the two segments. Additionally, an infrared or other electromagnetic signal may be used to transmit signals from the keyboard to the computing device without the need for a cable or other physical connection.

Figure 3:
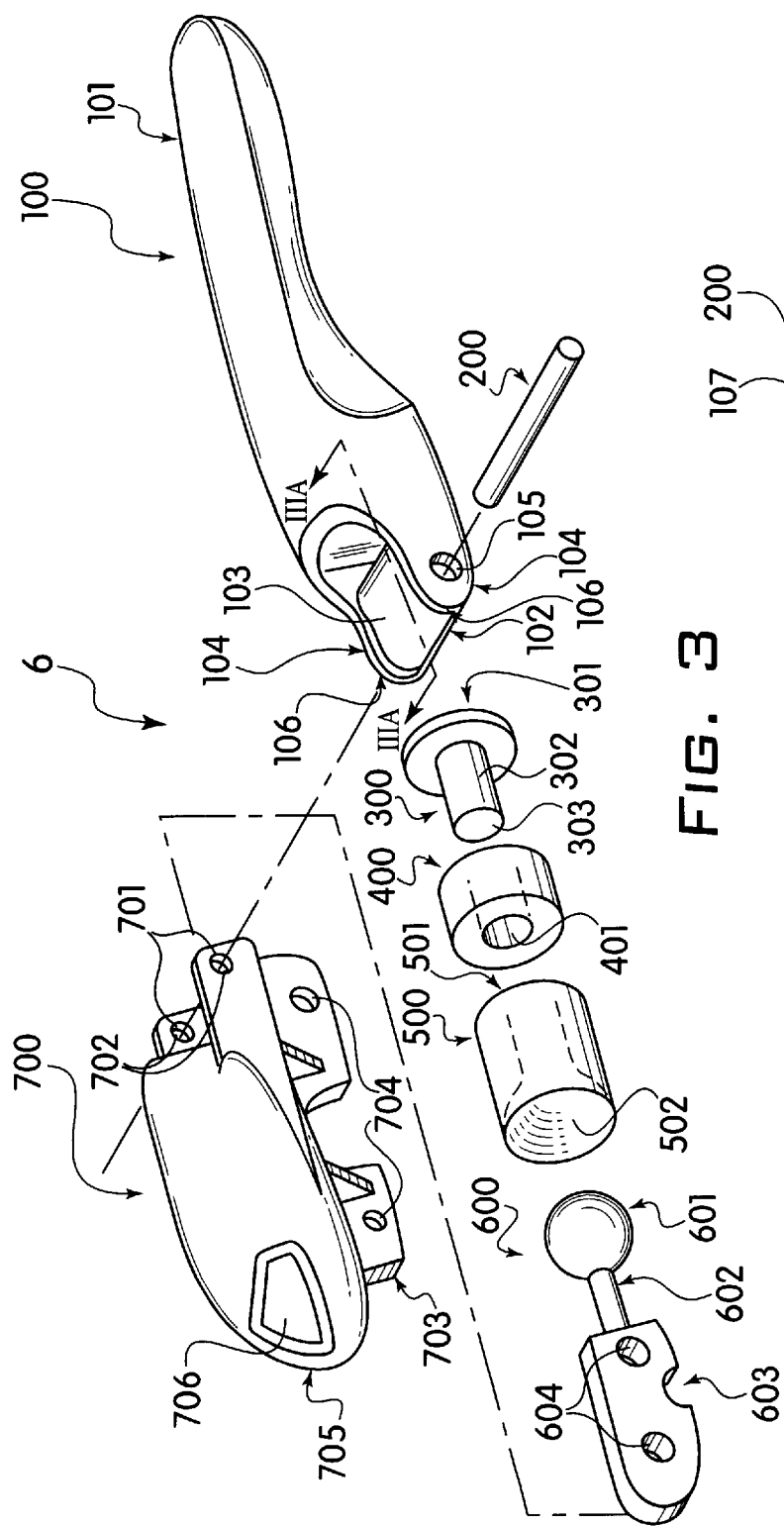
FIG. 3 is an exploded perspective view of the components of an embodiment of the hinge or joint and locking mechanism of the present invention.
Figure 3A:
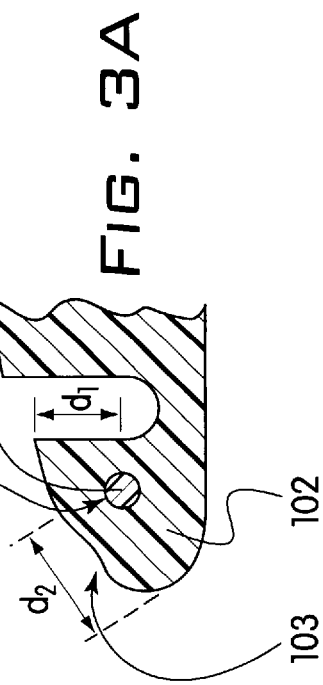
FIG. 3a is a cross-sectional view, through line IIIA—IIIA, of the cam of the embodiment of FIG. 3.

FIG. 3 shows an exploded view of the components of a first embodiment of a locking mechanism and hinge or joint of the present invention. A handle 100, in the form of a lever, includes a handle section 101 at one end and a cam 102 at another end. Cam 102 includes a cam surface 103. On either side of cam 102 are flanges 104, each of which includes a hole 105. A cam hole 107 passes through cam 102 and is aligned with holes 105. Handle 100 is preferably made of an inexpensive, but relatively rigid, material such as an engineering plastic such as polyketon, sold under the trade name CARILON.

A retaining pin 200 passes through holes 105 and the cam hole 107, to retain handle 100 on socket element 700. Pin 200 is preferably manufactured of an inexpensive and somewhat resilient material, such as an engineering plastic, for example a glass-filled polyamide or nylon, sold under the trade name GRIVORY GV-5H and has at least one end which is slightly enlarged, so as to allow a press or interference fit between the pin 200 and holes 105, to thereby hold handle 100 and socket element 700 together. Flanges 701 on socket element 700 fit slidingly within slots 106 between flanges 104 and cam 102, such that pin 200 fits through holes 105, holes 702 on flanges 701, and the cam hole 107, thereby allowing pivoting of handle 100 relative to socket element 700 about the axis of pin 200.

A camming pin 300 is retained adjacent to the cam 102. Camming pin 300 includes a camming surface 301 and a pin 302 projecting away from camming surface 301. Pin 302 fits through holes 401 and 501 in biasing element 400 and bearing element 500, respectively, such that bearing element 500, biasing element 400 and camming pin 300 are connected and aligned together. Camming pin 300 is preferably made of an inexpensive, but relatively rigid, material such as an acetal co-polymer or nylon, sold under the trade name DURACON-90.

A biasing element 400 is retained adjacent to the locking pin 300. The biasing element is preferably disc-shaped, and includes a hole 401 passing through its center. Biasing element 400 is preferably made of a relatively resilient material, such as a urethane rubber, or could be made of a spring steel component, so that it acts as a spring to provide a bias against the action of cam 102 during locking and unlocking. The biasing element 400 serves to reduce the need for exacting tolerances in the locking mechanism of the present invention. The biasing element 400 also serves as a clutching mechanism so that if too much pressure is exerted on the keyboard segments 2, 3, the provision of the biasing element 400 allows for slippage between the ball element 600 and socket element 700 described below.

A bearing element 500 is retained adjacent to the biasing element 400. On the end of bearing element 500 adjacent to the biasing element 400, the bearing element 500 includes a hole 501, through which the end of pin 302 passes. The opposite end of bearing element 500 includes a bearing surface 502 which is preferably hemispherical in shape. The bearing element 500 is mounted within socket element 700 for sliding movement relative to both the keyboard segments 2, 3. The bearing element 500 is preferably made of a relatively inexpensive and rigid material, such as an acetal copolymer, sold under the trade name DURACON M-90.

Figure 4:
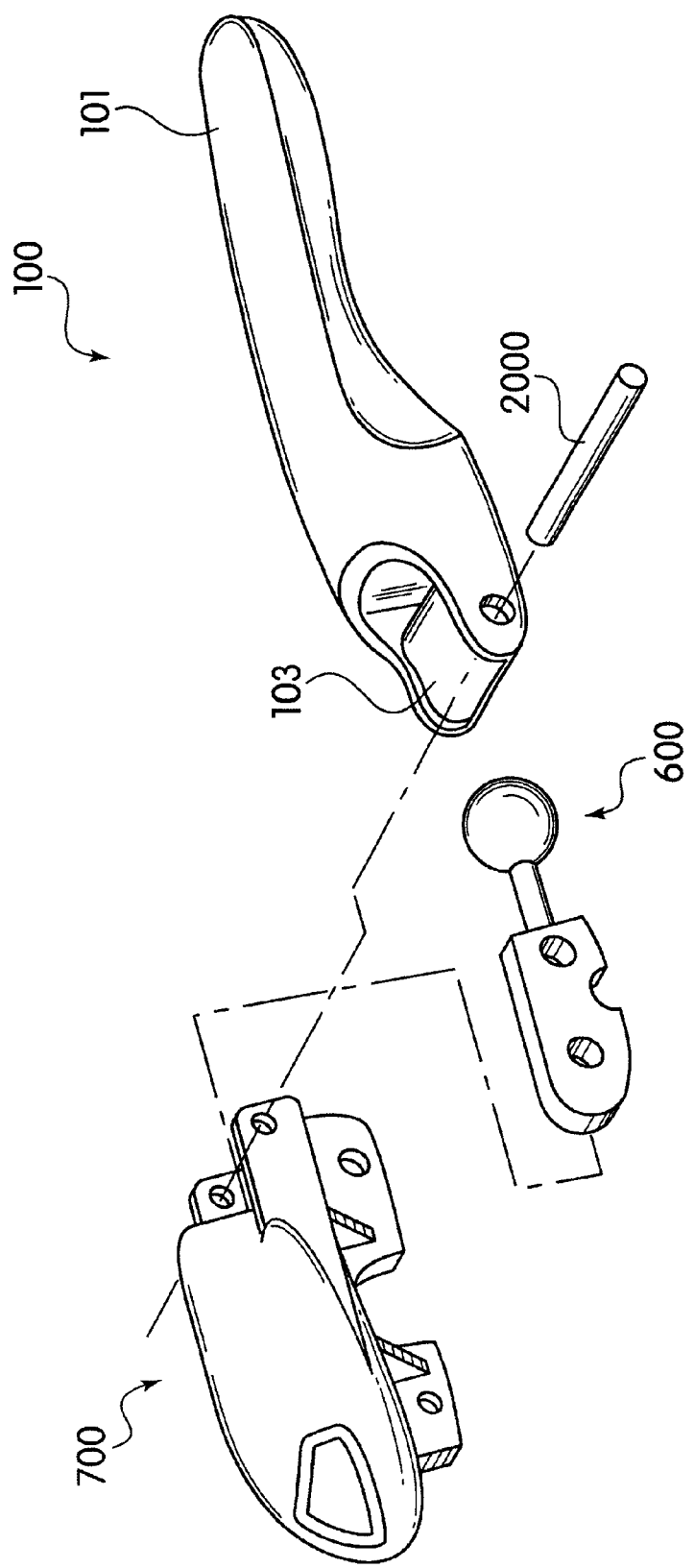
FIG. 4 is an exploded perspective view of the components of an alternative embodiment of the hinge or joint and locking mechanism of the present invention.

A ball element 600 is mounted adjacent to the bearing element 500. A ball 601 on ball element 600 fits within, and is slidably mounted against, bearing surface 502. A shaft 602 connects ball 601 to a retaining portion 603 of ball element 600. Retaining portion 603 may include one or more holes 604, which are used to affix ball element 600 to one of the keyboard segments 2, 3 or 4, via suitable attachment mechanisms such as screws or bolts. The ball element 600, although shown as spherical in the drawings, could alternatively be hemispherical in shape. The ball element 600 is preferably made of a relatively inexpensive and rigid material, such as a glass or mineral filled acetal copolymer, or alternatively could be fabricated of stainless steel. In an alternative embodiment of the invention, as can be seen in FIG. 4, the cam surface 103 may provide direct contact with the ball element 600, thereby eliminating the need for the bearing element 500 and biasing element 400.

Ball 601 fits within a socket element 700, such that the shaft 602 and retaining portion 603 project out of an opening 706 in socket element 700. An interior bearing surface of socket element 700, at socket end 705, is hemispherical in shape. Ball 601 on ball element 600 fits within, and is slidably mounted against, the bearing surface within socket end 705. Socket element 700 includes flanges 701, which are spaced and shaped so as to slidably fit within slots 106 on handle 100. Holes 702 on flanges 701 are spaced to align with holes 105 on handle 100, and the cam hole on handle 100, so that the pin 200 can fit through those holes, allowing the handle 100 to be pivoted relative to socket element 700. Socket element 700 may also include a flange 703 with one or more holes 704, which are used to affix socket element 700 to one of the keyboard segments 2, 3 or 4—adjacent the segment 2, 3 or 4 to which ball element 600 is affixed—via suitable attachment mechanisms such as screws or bolts. The socket element 700 is preferably made of a relatively inexpensive and rigid material, such as a glass or mineral filled acetal copolymer, or alternatively could be fabricated of metal.

Operation and manipulation of the keyboard 1 of the present invention will now be described. When it is desired to set a new position of the keyboard 1 segments 2 and 3 relative to one another, the handle 100 is pivoted to its unlocked position 100'. Pivoting of the handle 100 is accomplished by rotating handle 100 about pin 200, thereby moving cam 102 relative to camming surface 301. In the unlocked position 100', the cam surface 103 is spaced a shorter distance $d_1$ from the axis of pin 200 than the distance $d_2$ of cam surface 103 from the axis of pin 200 in the locked position. As a result, in the locked position, the cam 102 pushes the camming pin 300 in the direction of the ball element 600, and in the unlocked position 100', the cam 102 allows camming pin 300 a degree of movement away from ball element 600, under the influence of biasing element 400.

In the unlocked position 100' the bias of biasing element 400 allows camming pin 300 to move in the direction away from ball element 600. This movement also allows movement of the bearing element 500 away from the ball element 600. As a result, the ball 601 is unclamped between the bearing surface 502 and the bearing surface inside the socket end 705, allowing the ball 601 to rotate between those surfaces. Rotation of the ball 601 is effected by pivoting movement, in one or more planes, of the segments 2, 3 relative to one another, one of the segments 2, 3 being affixed to the retaining portion 603 projecting out of opening 706 in socket element 700, and the other segment 2, 3 being affixed to socket element 700.

When the segments are unlocked by moving handle 100 to unlocked position 100', the segments 2, 3 may be pivoted in a horizontal plane (i.e., the plane of FIG. 1) relative to one another to reduce or eliminate ulnar deviation in the user's hands and wrists. The segments 2, 3 may also be pivoted in a vertical plane (i.e., the plane of FIG. 2) relative to one another to reduce or eliminate pronation in the user's wrists.

After a desired orientation of the segments 2, 3 relative to one another is achieved, the handle 100 is pivoted around pin 200 to its locked position, thereby moving cam 102 relative to camming surface 301. In the locked position, the cam surface 103 is spaced a longer distance $d_2$ from the axis of pin 200 than the distance $d_1$ of cam surface 103 from the axis of pin 200 in the unlocked position. As a result, in the locked position, the cam 102 pushes the camming pin 300 in the direction of the ball element 600. In the locked position, the camming pin 300 moves in the direction toward ball element 600. This movement pushes the biasing element 400, and thus the bearing element 500, toward the ball element 600. As a result, the ball 601 is clamped between the bearing surface 502 and the bearing surface inside the socket end 705, fixing the ball 601 against rotation between those surfaces as the result of frictional forces. The segments 2, 3 are thus fixed in position relative to one another, as a result of the clamping of ball 601 between the bearing surface 502 and the bearing surface inside the socket end 705, as well as fixing of one of the segments 2, 3 to the retaining portion 603 and the other segment 2, 3 to socket element 700.

While the forgoing represents a description of preferred embodiments of the invention, it is to be understood that the claims below recite the features of the present invention, and that other embodiments, not specifically described hereinabove, fall within the scope of the present invention.

What is claimed is:

1. A keyboard comprising:
   a first keyboard segment, the first keyboard segment including keys;
   a second keyboard segment, the second keyboard segment including keys; and
   a joint coupling the first keyboard segment and the second keyboard segment, the joint allowing movement of the first keyboard segment and the second keyboard segment relative to one another, the joint including a locking mechanism, the locking mechanism locking the first keyboard segment relative the second keyboard segment, the locking mechanism including a cam, the joint including a ball, the ball affixed to one of the keyboard segments, the cam directly contacting the ball.

2. A keyboard comprising:
   a first keyboard segment, the first keyboard segment including keys;
   a second keyboard segment, the second keyboard segment including keys; and
   a joint coupling the first keyboard segment and the second keyboard segment, the joint allowing movement of the first keyboard segment and the second keyboard segment relative to one another, the joint including a locking mechanism, the locking mechanism locking the first keyboard segment relative to the second keyboard segment, the locking mechanism including a lever movable from a locking position to an unlocking position, the joint including a ball, the ball being affixed to one of the keyboard segments, a cam, the cam directly contacting the ball.

* * * * *